United States Patent [19]

Breault

[11] 4,185,145

[45] Jan. 22, 1980

[54] FUEL CELL ELECTROLYTE RESERVOIR LAYER AND METHOD FOR MAKING

[75] Inventor: Richard D. Breault, Coventry, Conn.

[73] Assignee: United Technologies Corporation, Hartford, Conn.

[21] Appl. No.: 941,825

[22] Filed: Sep. 11, 1978

[51] Int. Cl.² .................... H01M 8/02; H01M 8/08
[52] U.S. Cl. ............................. 429/34; 429/41; 429/44; 427/115
[58] Field of Search ............. 429/34, 41, 44, 38, 429/209, 72, 247, 253; 427/115, 113, 122; 428/408; 423/445, 448

[56] References Cited

U.S. PATENT DOCUMENTS

| | | |
|---|---|---|
| 3,519,486 | 7/1970 | Huebscher et al. ............. 429/41 |
| 3,779,811 | 12/1973 | Bushnell et al. ............. 429/41 X |
| 4,017,664 | 4/1977 | Breault ............................ 429/44 |
| 4,035,551 | 7/1977 | Grevstad ..................... 429/41 X |
| 4,038,463 | 7/1977 | Lamarine et al. ............... 429/44 |
| 4,064,322 | 12/1977 | Bushnell et al. ................. 429/41 |

*Primary Examiner*—Anthony Skapars
*Attorney, Agent, or Firm*—Stephen E. Revis

[57] ABSTRACT

A porous graphite reservoir layer for retaining electrolyte within a fuel cell is improved by coating the pore surfaces of the reservoir layer with wettable, particulate amorphous carbon. Preferably the amorphous carbon particles are colloidal and have a mean pore size considerably smaller than the pore size of the body which they coat. This coated reservoir retains its hydrophilic properties for an extended period of time.

15 Claims, 1 Drawing Figure

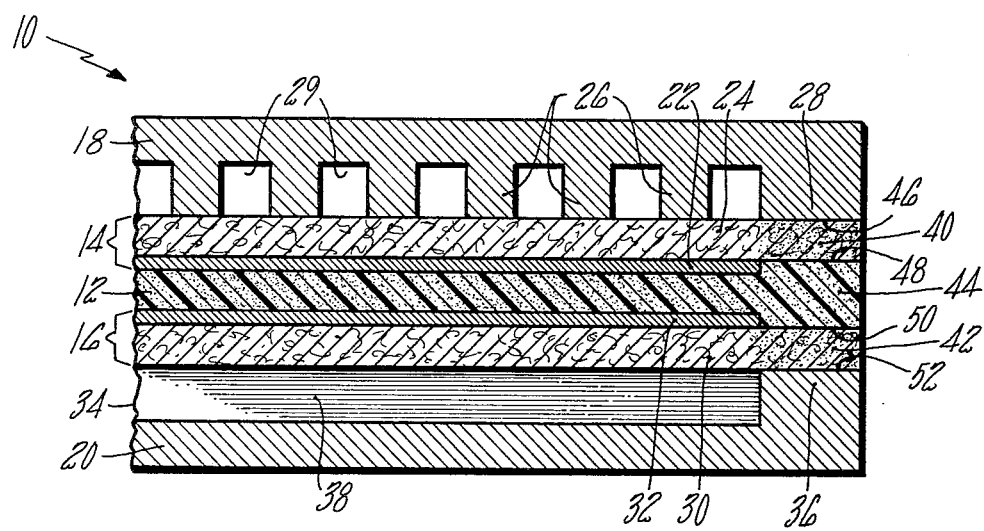

FUEL CELL ELECTROLYTE RESERVOIR LAYER AND METHOD FOR MAKING

BACKGROUND OF THE INVENTION

1. Field of the Invention

This invention relates to fuel cells, and more particularly to electrolyte volume control within a fuel cell.

2. Description of the Prior Art

Electrolyte reservoir layers or plates disposed in fuel cells are well known for accommodating volume changes in the electrolyte during fuel cell operation. The following commonly owned U.S. Patents relate to fuel cell reservoir layers: U.S. Pat. Nos. 3,779,811; 3,905,832; 4,035,551; 4,038,463; and 4,064,322. Obviously, these reservoir layers must be made from either hydrophilic material or from material which is treated so as to be hydrophilic in order that they readily retain electrolyte within their pores.

A material commonly suggested for use as a reservoir layer in a phosphoric acid electrolyte fuel cell is carbon fibers bonded together with a resin, such as a phenolic resin, and heated to convert the resin and carbon fibers to graphite. Alternatively, carbon or graphite fibers may be bonded together with pyrolytic graphite by placing a mat of fibers in a decomposable hydrocarbon (e.g., methane) atmosphere under conditions which cause the hydrocarbon to break down into carbon and hydrogen. The carbon (now pyrolytic graphite) deposits on the fibers. Materials of the two foregoing types are available commercially and are referred to in the art as carbon papers.

Several problems have been experienced when using these materials as electrolyte reservoirs. For example, although these materials are initially hydrophilic, when exposed to air and moisture the material becomes hydrophobic over a period of several months. This is the result of a carbon/oxygen specie forming a layer on the exposed surfaces of the material. Thus, these materials have a poor shelf life or may require special storage prior to use.

Even if these reservoir layers are placed into a fuel cell immediately upon fabrication, when disposed on the anode side of the cell the exposure to hydrogen and water vapor at cell operating temperatures also results in the slow formation of a hydrophobic compound on the exposed surfaces of the material. This reduces the effectiveness of the reservoir layer over a period of time and also makes it difficult to replenish the cell with electrolyte if such becomes necessary.

SUMMARY OF THE INVENTION

An object of the present invention is a hydrophilic reservoir layer for a fuel cell which does not lose its hydrophilic property with time under normal operating conditions.

According to the present invention, an electrolyte reservoir comprises a porous, hydrophilic graphitic body having a coating of particulate, wettable, amorphous carbon on its pore surfaces.

As used herein, "pore surfaces" means the surfaces which form the pores of the graphite body; and "wettable" means wettable by the electrolyte used in the fuel cells. Wettable is sometimes used interchangeably with "hydrophilic."

In the usual case the porous graphite body comprises a sheet of graphitized carbon fibers bonded together with a pyrolytic graphite or with a resin which has been converted to graphite. In the alternative the porous graphite sheet material may be made by molding graphite powder and a resin, such as phenolic resin, and heating the molded body to graphitize the resin. In either case this material is at least 50% porous and preferably is at least 75% porous.

The amorphous carbon which is selected to form the coating on the surfaces of the graphite body must have several properties. One required property is that the carbon be wettable by the electrolyte. Hydrophilicity of the carbon may be defined in terms of its oxygen content. We suggest that the oxygen content of the amorphous carbon be at least one percent by weight. Additionally, the particle size of the amorphous carbon should be at least one and preferably two or more orders of magnitude smaller than the pore size of the uncoated graphite body in order that the amorphous carbon particles can readily enter the pores of the graphite body and form a thin, uniform coating on the pore surfaces without substantially reducing the porosity of the body. This generally means the amorphous carbon particles will need to be colloidal in size since the uncoated graphite body will typically have a mean pore size of somewhere between 10 and 100 microns. It is believed a coating having a thickness of only one or two particles is sufficient and will be effective.

In addition to the foregoing properties, the amorphous carbon selected for use in the present invention should have a moderate to high surface area such that the pores of the particles in the coating are small enough to hold electrolyte with sufficient tenacity to ensure that substantially all the pore surfaces of the reservoir layer are always wet. Preferably the particles will have a mean pore size of less than about 0.1 micron. This will probably be at least two orders of magnitude less than the mean pore size of the uncoated graphite body. It is felt that the coating's ability to retain electrolyte and thus keep the pore surfaces of the underlying graphite material continuously wet is responsible for preventing the reservoir layer from becoming hydrophobic. Tests to date have shown that the present invention can extend the useful life of a reservoir layer by at least a factor of ten.

A preferred method for applying the amorphous carbon coating to the graphite body is to form a stable liquid dispersion of the amorphous carbon and to impregnate the graphite body with this dispersion so as to saturate the void volume. The liquids are thereafter removed by heating. Since no binder is used to attach the coating to the surfaces of the graphite body, Van der Waals forces are relied upon for this purpose. Van der Waals forces are inversely proportional to particle size. Thus, a further reason exists for utilizing small and preferably colloidal size amorphous carbon particles.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a transverse sectional view showing an electrochemical cell which includes a reservoir layer.

DESCRIPTION OF THE PREFERRED EMBODIMENT

A "carbon paper" mat ideally suited as the underlying graphite body of the reservoir layer was made by mixing Union Carbide's VMA grade chopped carbon fibers (nominal diameter 10μ) with a phenolic resin, forming the coated fibers into a mat or sheet, and heating the mat to at least 2100° C. to convert the carbon fibers and the resin to 100% graphite. The mat was 75% porous, had a thickness of about 0.075 inch, a pore size range of from 20μ to 60μ and a mean pore size of 40μ.

A stable aqueous colloidal dispersion of amorphous carbon was formed by ultrasonically blending 1624 grams of Vulcan ® XC-72 carbon into a mixture consisting of 98,400 milliliters H$_2$O and 492 milliliters Triton ® X-100 surfactant. Vulcan XC-72 carbon is a highly porous, wettable amorphous carbon powder manufactured by Cabot Co., Billerica, MA having a surface area of about 270 n$^2$/g, a particle size range of from 0.1 to 1.0 micron, and an oxygen content of greater than one and usually less than two weight percent. Triton X-100 is a non-ionic surfactant manufactured by Rohm and Haas of Philadelphia. It disperses the carbon and also lowers the surface tension of the dispersion to facilitate impregnation and wetting of the graphite mat.

The graphite mat was then impregnated with the foregoing aqueous dispersion in a manner which ensured that the entire void volume of the mat was saturated. We impregnated the mat by passing it once between rollers having a sponge-like surface which is constantly soaked with the aqueous dispersion by having the lower portion of the roller sitting in a bath of the dispersion. The method for impregnating the mat is not critical to the present invention. For example, the mat could be impregnated by dipping it in a bath of the aqueous dispersion, by dripping the dispersion onto the mat, or by spraying the mat with the dispersion.

The liquids were then removed from the impregnated mat. In the present example the water was evaporated and the Triton X-100 surfactant was burned off by heating in air at 650° F. for five minutes. In accordance with the present invention the liquids could have been removed by any suitable combination of heating and/or leaching, as required.

The thickness of the resulting amorphous carbon coating is preferably the minimum thickness necessary to impart the required wettability to the graphite mat pore surfaces. The maximum acceptable thickness will be determined by the minimum acceptable porosity of the coated mat, realizing that the porosity is reduced as the thickness of the coating increases. The coating thickness will be partially determined by the solids content of the dispersion. In the foregoing example the solids content of the dispersion was 0.16 weight percent; and the single pass impregnation procedure described above resulted in an effective, uniform coating having a thickness of only about one monolayer of particles. Dispersion with solids contents of less than about 0.10 weight percent proved to be unacceptable, at least with our coating procedure.

The above described amorphous carbon coated graphite mat has been run under anode operating conditions in a fuel cell using phosphoric acid electrolyte for 30,000 hours without becoming hydrophobic. This compares with prior art mats which, under similar operating conditions, would become hydrophobic in just 2000 to 3000 hours.

The sole FIGURE shows the foregoing reservoir layer in an exemplary fuel cell configuration. The fuel cell is shown and designated by the numeral 10. The fuel cell 10 includes an electrolyte retaining matrix 12, an anode electrode 14, a cathode electrode 16, and gas separators 18, 20. The cell uses phosphoric acid as the electrolyte.

In this embodiment the anode electrode 14 includes a catalyst layer 22 bonded to a reservoir layer 24 made in accordance with the procedure outlined above; thus, the reservoir layer in this embodiment is also an electrode substrate since it supports the catalyst layer. The gas separator 18 includes ribs 26 and an edge portion 28. Hydrogen or other suitable fuel is introduced into the fuel spaces 29 between the reservoir layer and the gas separator. In a stack of fuel cells the separator 18 would have oxidant on the other side thereof for feeding the cathode electrode of an adjacent cell. The catalyst layer 22 is comprised of catalyst particles bonded together with a hydrophobic material such as polytetrafluoroethylene. A preferred catalyst is platinum supported on carbon particles.

Liquid transfer within the cell occurs through the action of capillary forces. The smaller the pore, the larger the capillary force and the greater the liquid retention capability. Liquid transfer between the matrix 12 and the reservoir layer 24 occurs directly through the pores of the catalyst layer 22 which is partially hydrophilic. In any event, the catalyst layer may be provided with holes to aid in this liquid transfer if desired or if it is felt to be necessary.

In this exemplary embodiment the cathode electrode 16 also comprises a reservoir layer 30 having a catalyst layer 32 bonded thereto. It should be noted, however, that in many applications a reservoir layer on only one side of the cell will be necessary or desirable. The separator 20 also includes ribs 34 and an edge portion 36. The ribs 34 of the cathode are parallel to the plane of the paper and form oxidant spaces 38 between the separator 20 and the reservoir layer 30.

In this embodiment the reservoir layers 24, 30 include peripheral sealing portions 40, 42, respectively. These sealing portions are sandwiched between the edge portion 44 of the matrix 12 and the edge portions 28, 36 of the gas separators 18, 20, respectively. The sealing portions 40, 42 are impregnated, such as with the material of which the matrix 12 is made in order that the entire void volumes of these portions always remain essentially completely filled with electrolyte as long as the matrix 12 is filled with electrolyte. Liquid seals are thereby formed at the surfaces 46, 48, 50, and 52 in the manner described in U.S. Pat. No. 3,867,206 of common assignee with the present invention. The seals prevent the escape of reactant gas from within the cell. They form no part of the present invention.

The above described type of fuel cell construction, which is similar to that shown in aforementioned U.S. Pat. No. 4,035,951, is exemplary of the type in which a reservoir layer of the present invention may be employed. It should be apparent, however, that the reservoir layer of the present invention may be utilized in virtually any fuel cell configuration, such as those described in the other commonly owned U.S. patents mentioned in the Background of the Invention. In particular, the electrode may have a conventional substrate (to which the catalyst layer is bonded) which is not intended to provide significant electrolyte storage for volume control. In those cells a separate reservoir layer is usually disposed behind the conventional electrode substrate but in liquid communication with the electrolyte retaining matrix. This type of construction is shown in aforementioned U.S. Pat. Nos. 3,779,811 and 3,905,832. U.S. Pat. Nos. 4,038,463 and 4,064,322 describe fuel cell configurations wherein the reservoir layer is selectively wetproofed to provide better reactant gas flow from the reactant gas space to the catalyst layer. It is apparent that reservoir layers according to the present invention may also be selectively wetproofed.

It is also apparent that the reservoir/substrate layers 24, 30 may be configured in accordance with the teachings of U.S. Pat. Nos. 4,115,627 whereby they, instead of the separators 18, 20, include the ribs which help define the reactant gas spaces.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A reservoir comprising a porous, hydrophilic graphite body having a coating of particulate, wettable, amorphous carbon on its pore surfaces.

2. The reservoir according to claim 1 wherein said amorphous carbon has an oxygen content of at least 1.0 weight percent.

3. The reservoir according to claim 1 wherein said particulate carbon is colloidal in particle size.

4. The reservoir according to claim 1 wherein the mean pore size of said particulate carbon is at least two orders of magnitude less than the mean pore size of the uncoated graphite body.

5. The reservoir according to claim 1 wherein the mean pore size of said particulate carbon is less than 0.1 micron.

6. The reservoir according to claim 3 wherein said coating is so thin the porosity of the coated body is virtually unchanged from that of the uncoated body.

7. The reservoir according to claim 1 wherein said graphite body comprises graphitized carbon fibers.

8. An electrolyte reservoir comprising a porous, hydrophilic graphite body having a coating of colloidal size amorphous carbon articles on its pore surfaces, said particles having an oxygen content of at least 1.0 weight percent and a mean pore size of less than 0.1 micron, said coated reservoir having a porosity of at least 50%.

9. The reservoir according to claim 8 having a porosity of at least 75%, wherein the mean pore size of said graphite body is between 10 and 100μ.

10. The reservoir according to claim 9 wherein said graphite body comprises graphitized carbon fibers bonded together with a resin which has been converted to graphite.

11. The reservoir according to claim 9 wherein said graphite body comprises graphitized carbon fibers bonded together with pyrolytic graphite.

12. In an improved fuel cell utilizing a phosphoric acid electrolyte and a porous reservoir layer for controlling electrolyte volume within the cell, the reservoir layer comprising graphitized carbon fibers bonded together, the improvement comprising:
 a coating of particulate, wettable, amorphous carbon on the pore surfaces of said reservoir layer.

13. The improved fuel cell according to claim 12 wherein said reservoir layer includes a catalyst layer adjacent and in continuous contact therewith.

14. The improved fuel cell according to claim 12 wherein said amorphous carbon particles are colloidal and have a mean pore size at least two orders of magnitude less than the mean pore size of the uncoated reservoir layer.

15. The improved fuel cell according to claim 14 wherein said coated reservoir layer has a porosity of at least 75%.

* * * * *